May 10, 1960
H. E. HEDBERG
2,936,417
DIRECTIONAL POWER MONITOR
Filed April 6, 1955
6 Sheets-Sheet 1
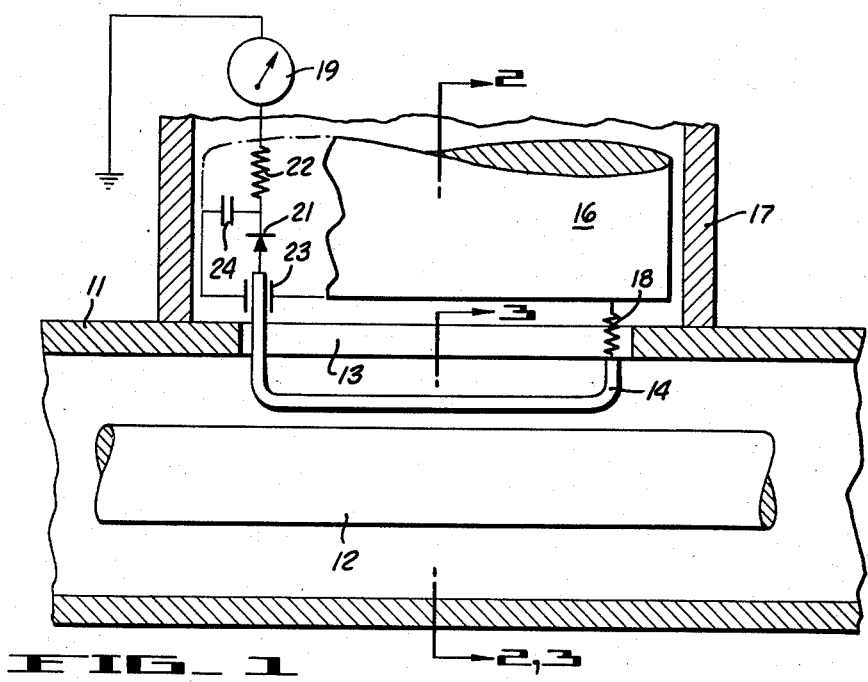
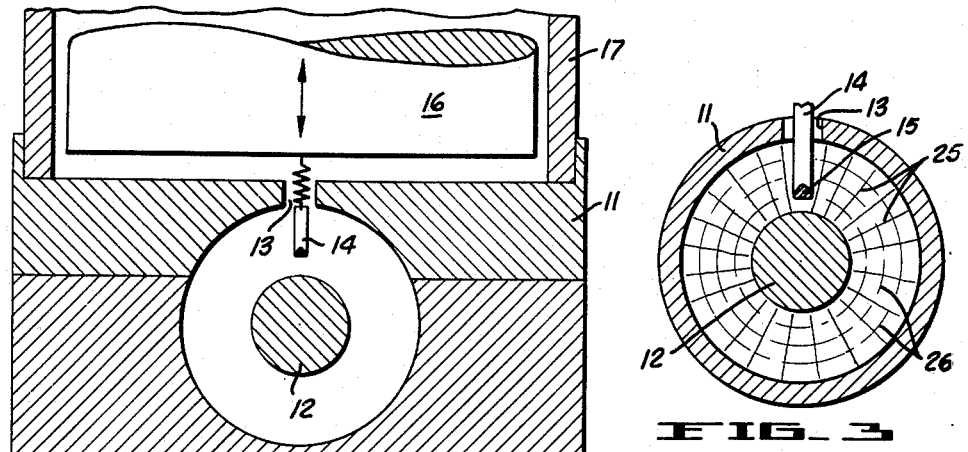
INVENTOR.
HAROLD E. HEDBERG
BY
ATTORNEYS

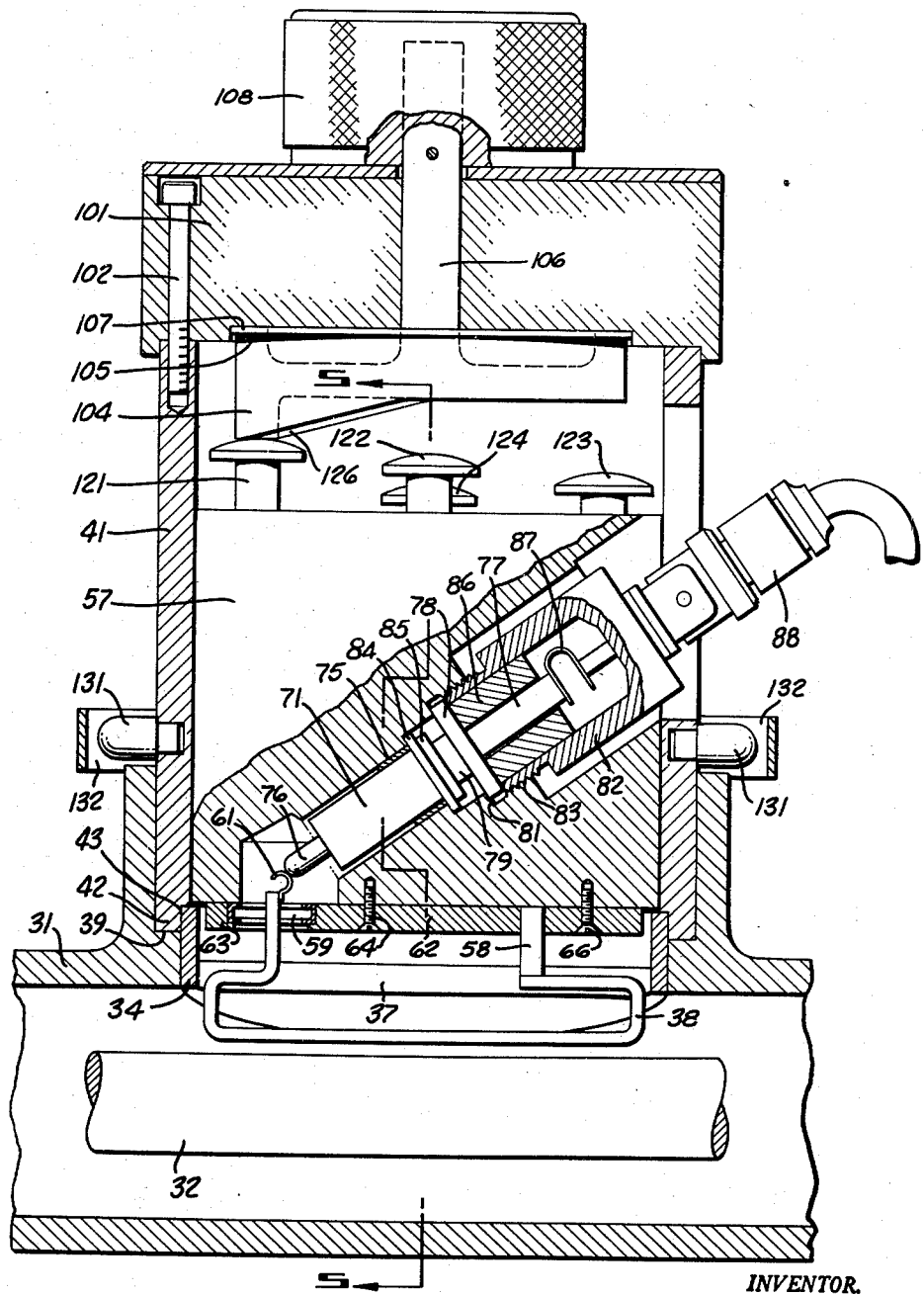

May 10, 1960 H. E. HEDBERG 2,936,417
DIRECTIONAL POWER MONITOR
Filed April 6, 1955 6 Sheets-Sheet 3
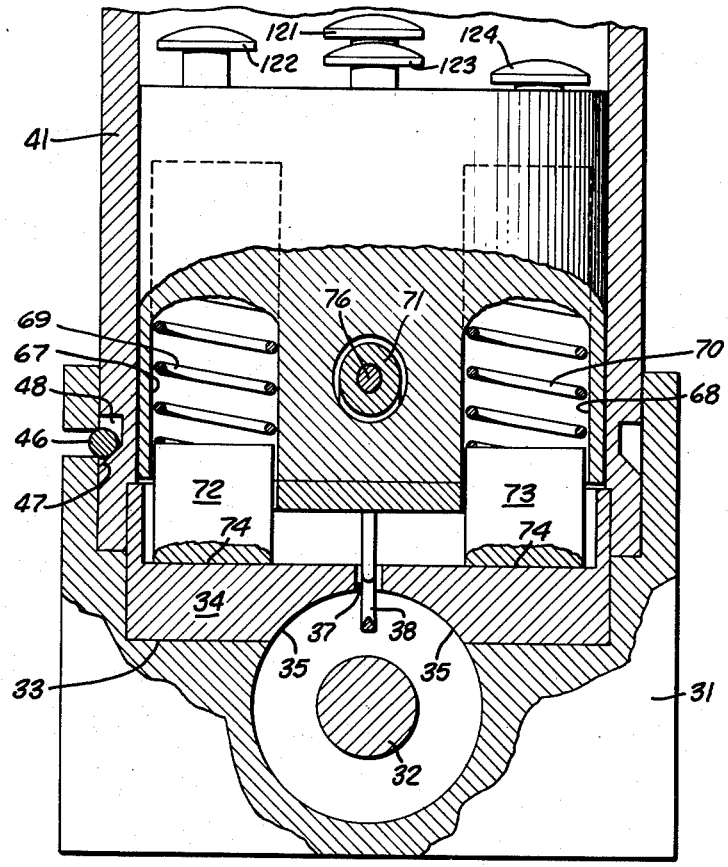
FIG_5
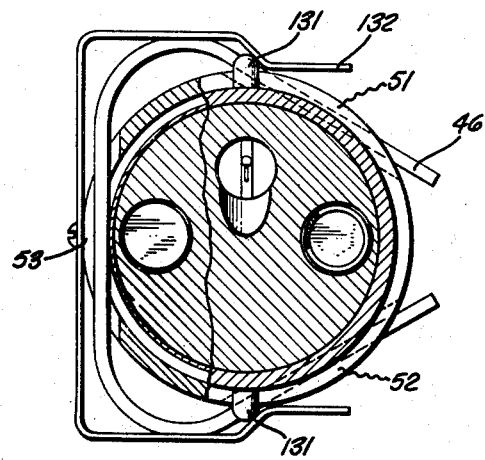
FIG_6
INVENTOR.
HAROLD E. HEDBERG
BY
ATTORNEYS

INVENTOR.
HAROLD E. HEDBERG
BY
ATTORNEYS

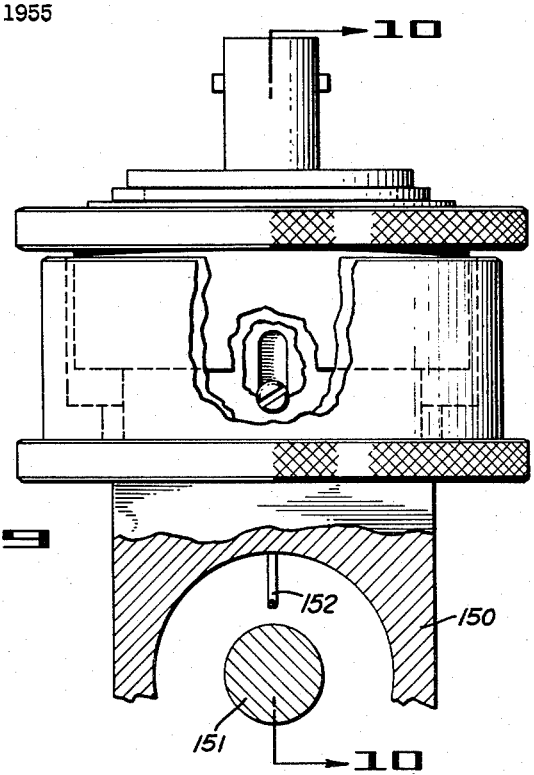
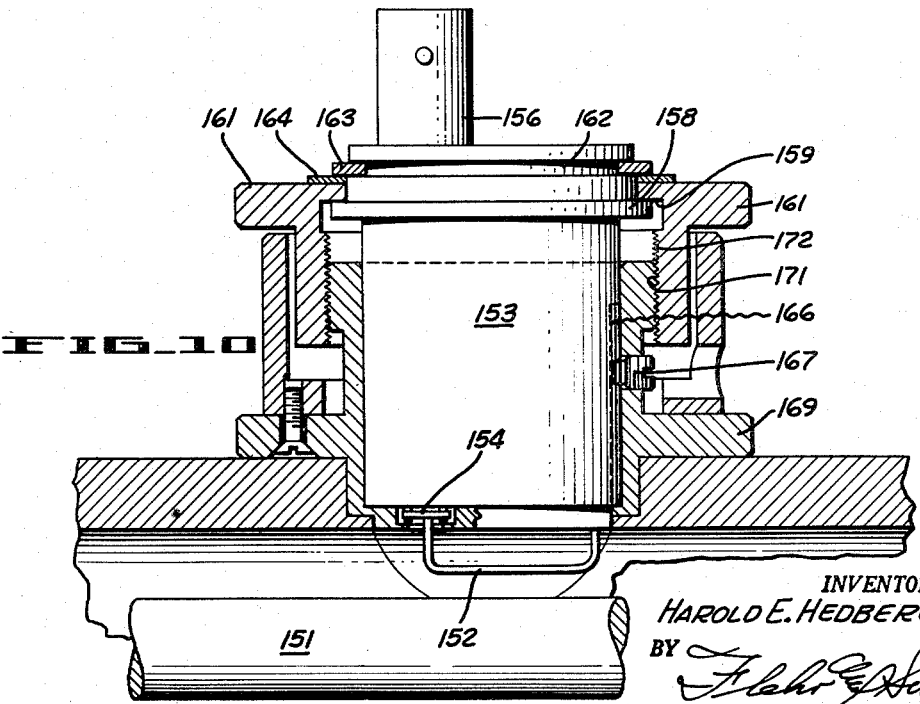

United States Patent Office 2,936,417
Patented May 10, 1960

2,936,417

DIRECTIONAL POWER MONITOR

Harold E. Hedberg, Redwood City, Calif., assignor to Sierra Electronic Corporation, San Carlos, Calif., a corporation of California Application April 6, 1955, Serial No. 499,638

14 Claims. (Cl. 324—95)

This invention relates generally to high frequency power monitors and more particularly to a power monitor capable of operations over a broad band of frequencies and a wide range of power.

In many applications it is necessary to monitor power flow to and power reflected from an antenna or load. It is well known that resistive loop couplers associated with the coaxial line or wave guide system have directional characteristics. Couplers of this type have been used in conjunction with indicating means for monitoring power flow.

A disadvantage with these couplers has been that the coupling is fixed for a particular loop. As a result, it is necessary to employ a large number of coupling loops to monitor over a wide power range.

It is an object of this invention to provide a novel high frequency power monitor.

It is another object of this invention to provide a power monitor capable of operation over a wide power range.

It is a further object of this invention to provide a power monitor which makes use of a single loop with adjustable penetration to monitor power over a wide power range.

It is a further object of the present invention to provide a power monitor which has a high substantially constant directivity over a wide frequency band and power range.

It is a further object of this invention to provide a power monitor making use of a single loop with adjustable penetration and which has high directivity independent of penetration.

It is still a further object of this invention to provide a monitor of the above character which has a low voltage standing wave ratio.

These and other objects of the invention will be more apparent from the following description and drawings.

Referring to the drawings:

Figure 1 is a schematic side elevational view partly in section of apparatus which incorporates my invention;

Figure 2 is a sectional view taken along the line 2—2 of Figure 1;

Figure 3 is an enlarged view of the portion 3—3 of Figure 1; showing the electromagnetic field lines;

Figure 4 is a side elevational view partly in section of one embodiment of apparatus constructed in accordance with my disclosure;

Figure 5 is a sectional view taken along the lines 5—5 of Figure 4;

Figure 6 shows the retaining and locating springs;

Figure 9 is a side elevational view of another embodiment of my invention;

Figure 10 is a sectional view taken along the lines 10—10 of Figure 9;

Figure 7A:
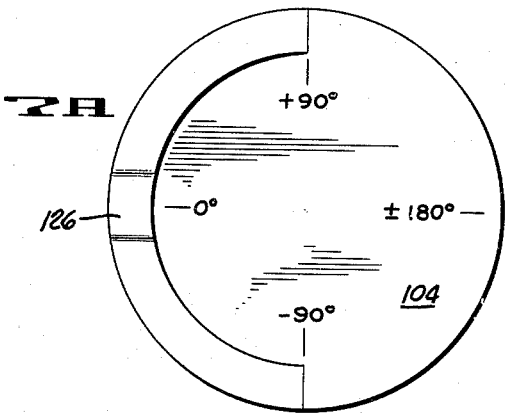
Figures 7A and 7B show the cam and pin arrangement which determines the penetration of the coupling loop.
Figure 7B:
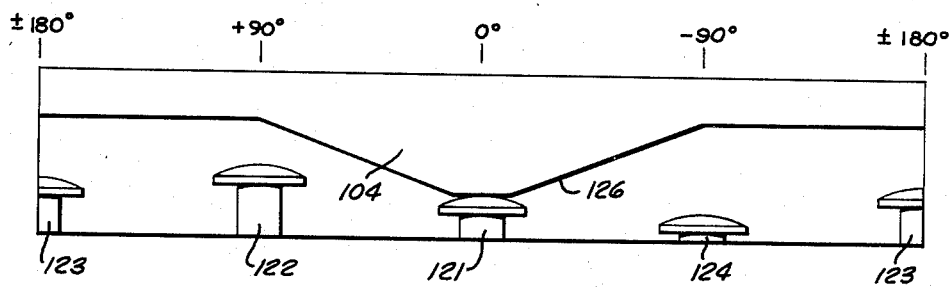

As is well known, the lines of current flow associated with the electromagnetic field in a coaxial transmission line run parallel to the axis of the transmission line in an unslotted line. The effect of a slot on the lines of current flow is negligible if the slot is narrow and runs parallel to the axis of the transmission line. The distortion of the associated electric and magnetic components of the electromagnetic field is also negligible.

When employing a coupling loop to monitor power flowing in a particular direction in a transmission line, it can be shown that when $$M/C = RZ_0$$

where:

M = Magnetic (inductive) coupling
C = Electric (capacitive) coupling
$Z_0$ = Characteristic impedance of the line
R = Terminating resistance employed the directivity is a maximum.

Referring to Figures 1, 2 and 3 I have shown a section of coaxial transmission line having an outer conductor 11 and an inner conductor 12. The outer conductor 11 is provided with an elongated slot or opening 13 through which the coupling loop 14 is inserted into the coaxial transmission line.

A sleeve 17 is located adjacent to the slot 13 and has its axis perpendicular to the axis of the transmission line. A plug 16 is slidably fitted within the sleeve and controls the penetration of the loop 14. One end of the loop 14 is resistively connected to the plug 16. The other end of the loop is connected to indicating means 19 through the series combination of crystal rectifier 21 and the resistor 22. The loop 14 is capacitively coupled 23 to the plug 16. The common junction of the crystal rectifier and resistor is also capacitively coupled 24 to the plug. The network including the resistor 18, coupling loop 14, capacities 23 and 24, crystal rectifier 21 and resistor 22 serves to provide means for indicating the power flowing in the transmission line. The circuit elements are chosen to provide operation over a broad band of frequencies. It is to be understood, that other configurations of circuit elements may be used in conjunction with the indicating means. By sliding the plug 16 the penetration of the loop 14 is controlled. As the penetration increases, the magnetic and capacitive coupling increases, thus permitting the monitoring of lower power levels.

Figure 3 shows a cross-sectional view of the outer conductor 11, inner conductor 12 and coupling loop 14. The lines 25 represent the electric lines of the electromagnetic field while the lines 26 represent the magnetic lines. The distortion introduced by the slot 13 is negligible. As the coupling loop 14 is moved toward and away from the inner conductor 12 the ratio of capacitive to inductive coupling remains substantially constant. Thus, the directivity remains substantially constant over the range of power being monitored. It is seen that I have provided novel means for introducing a coupling loop into a transmission line. The ratio of magnetic (inductive) to electric (capacitive) coupling remains substantially constant throughout the range of penetration. This permits the use of a single coupling loop to monitor a wide range of power.

By varying the cross section 15 of the portion of the coupling loop which runs parallel to the center conductor 12 a slight increase or decrease of electric (capacitive) coupling may be achieved. It is also possible to adjust the capacitive coupling by applying a strip of material to the loop.

If plug 16 is withdrawn from the sleeve 17 until the coupling loop 14 is free of the slot 13, the plug and associated coupling loop may be rotated 180 degrees. By doing this, the power flowing in an opposite direction may be monitored. Thus means are provided for monitoring power flowing toward, and power reflected by a load or antenna.

Referring to Figures 4 through 7, I have shown a monitoring apparatus which may be employed to monitor power traveling in either direction and in which it is not necessary to withdraw the loop to change direction. Further, means are provided for accurately controlling the penetration of the loop into the coaxial line. Thus the equipment may be calibrated to monitor power over several power ranges.

The apparatus includes a section of transmission line having outer conductor 31 and inner conductor 32. The outer conductor 31 may be suitably formed, for example by casting a piece of material such as aluminum or copper. The inner surface of the outer conductor is suitably finished, as required for high frequency operation. The outer conductor is bored perpendicular to the axis of the transmission line to form a seat 33. A piston-like member 34 is accommodated within the seat. The face of the member 34 is shaped to form a surface 35 which becomes a portion of the outer conductor 31. An elongated slot 37 is cut in the member 34, to receive the coupling loop 38. A second cylindrical bore coaxial with the aforementioned bore forms a suitable shoulder 39. Outer sleeve 41 rides within this bore and its end 42 engages and is fastened to the extension 43 of the piston-like member 34. The piston-like member 34 and the sleeve 41 as seated by the spring 46 which rides against the shoulder 47 of the circumferential groove 48. The spring 46 is seated in the grooves 51, 52 and 53, Figure 6.

A plug member 57 is slidably received by the sleeve 41. The loop 38 has one end attached to the plug through resistor 58. The other end of the loop 38 passes through the disc capacitor 59 and is provided with a spring contact member 61. The shoulder 63 of plate 62 holds the disc capacitor 59 in place. The plate 62 may be attached to the plug 57 by a well-known means, for example by screws 64 and 66. The plug 57 is bored 67 and 68 to accommodate springs 69 and 70. The springs urge the slugs 72 and 73 against the inner surface 74 of member 34. The action of the springs and slugs is to urge the member 57 away from the member 34. As a result, there is a positive force retracting the coupling loop 38. This force, acting in conjunction with cam means to be presently described, provides means for accurately determining the penetration of the loop 38.

The plug 57 is also bored to accommodate crystal rectifier cartridge 71. The metallic shell of the cartridge is insulated from the plug by means of dielectric material 75. For example, this material may comprise transparent cellophane tape. The washer 84 insulates the end portion 85 from the plug 57. When the cartridge is inserted within the bore, the central prong 76 is brought into contact with the spring member 61. The crystal cartridge 71 is connected to resistor 77 by the conductive member 79. The outer periphery of disc capacitor 78 abuts the shoulder 81 and capacitively connects the crystal and resistor to the plug 57. The member 82 has its one end portion threaded 83 to engage the mating thread formed on the plug 57. The member 82 urges the disc capacitor 78 into positive electrical contact with the plug 57. The resistor 77 is held coaxially by the insulating member 86 which rides within the member 82. A spring member 87 makes contact between the resistor 77 and the inner conductor of the coaxial connector 88. Thus, I have provided means connecting a resistor 58, loop 38, crystal cartridge 71, and the resistor 77 in a series. These members, in essence, form the inner conductor of a coaxial system with the bore forming the outer conductor. The disc capacitor 59 provides a capacitive connection between the end of the loop and the plug. The disc capacitor 78 forms a capacitive connection between the common junction of the crystal rectifier and resistor 77 and the plug 57. The cylindrical member 41 is slotted to accommodate the coaxial connector and allow the plug 57 to slide within the member 41.

A cover 101 is fitted on the sleeve 41, and is affixed thereto by suitable means, for example by means of screws 102. A cam member 104, provided with a shaft 106, rides on the surface 105. The shaft protrudes through the accommodating bore formed in the cover. A washer 107 is interposed between the cam 104 and the member 101 to form a suitable sliding surface. The shaft 106 is engaged by knob 108.

Referring to Figure 7A, a view of the cam surface is shown. To more clearly illustrate the operation of the cam, it has been laid out in Figure 7B. Thus it is seen that the cam extends over 180 degrees of the surface and reaches a maximum at zero degrees. A series of pins 121, 122, 123 and 124 are attached to the plug 57. By turning the knob 108, the portion 126 of the cam is brought into contact with one of the pins. The cam provides an opposing force to the force exerted by the springs 69 and 70 and thereby causes the coupling loop to penetrate to a depth which corresponds to the height of the particular pin engaged by the surface 126. For example, if the portion 126 is brought against the pin 122 the loop is at its greatest penetration. On the other hand, when portion 126 is brought adjacent to the pin 124, the loop is at its least penetration. As previously described, the penetration of the loop 38 determines the power range of the monitor. With the greatest penetration, corresponding to the portion 126 lying adjacent to the pin 122, the lowest power range is utilized, i.e., small amounts of power may be detected and monitored. On the other hand, when the portion 126 is opposite the pin 124, the loop is at its least penetration and larger power may be monitored without exceeding the range of the indicating instrument 19.

Figure 8:
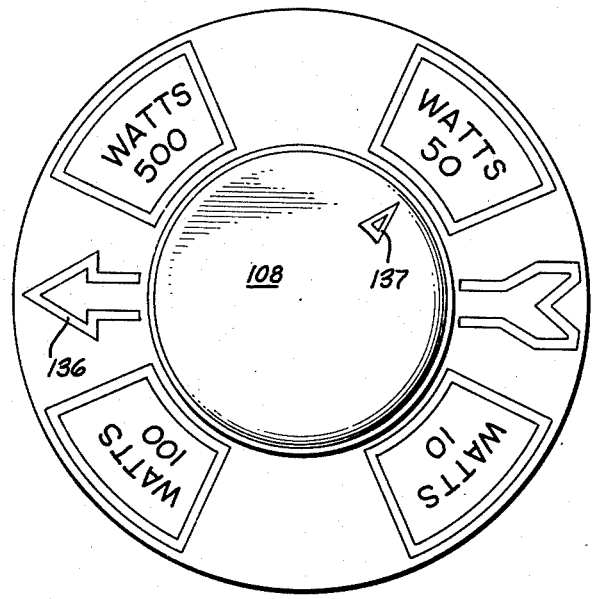
Figure 8 is a view showing the dial and associated indexing marks.

To monitor power flowing in an opposite direction, the complete assembly including the plug 57, sleeve 41 and knob 108 are rotated 180 degrees. The indexing pins 131 engage the associated spring 132 and thereby accurately align the loop within the transmission line. Referring to Figure 8, the arrow 136 indicates the direction in which power is being monitored while the arrow 137 indicates the power range, i.e., corresponds to the penetration of the loop.

In Figures 9 and 10, I have shown another embodiment of my device which includes threaded means for adjusting the penetration of the coupling loop. Thus the penetration may be accurately positioned at any predetermined value.

The device comprises an outer conductor 150 and inner conductor 151. A coupling loop 152 extends into the transmission line through a slot (not shown). The dimensions of this slot are such that the effect that it has upon the current flow is negligible. One end of the loop 152 is connected to the plug 153 by a resistor (not shown). The other end of the coupling loop is connected to a crystal rectifier cartridge (not shown). Capacitor 154 provides a capacitive connection between the plug 153 and the coupling loop 152. The coaxial connector 156 is connected to the loop 152 through a resistor (not shown) and the crystal rectifier connected in the series. The common junction of the detector and resistor is capacitively connected to the plug 153. The connections and circuits employed here are not shown because they are substantially as described in the embodiment previously described.

The plug 153 has a portion 158 of increased diameter. This portion 158 rides against the shoulder 159 formed on knurled knob 161. A groove 162 is provided in the upper portion of the plug 153. This groove accommodates the snap-in spring 163. A washer 164 is placed on the upper shoulder of the knob 161 and the snap-in ring 163 is snapped in place. The washer 164 is sprung to prevent backlash between the plug 153 and the knob 161. The plug 153 is notched 166 to receive the end of set screw 167. The screw 167 is screwed into threaded member 169. The plug 153 is slidably fitted within the member 169. The screw 167 prevents rotation of plug 153 within the member 169. The member 169 is threaded 171 to engage the threads 172 formed on the knob 161. Thus by engaging the thread 172 with the thread 171 and turning of a knob 161, the plug 153 is moved linearly to control the penetration of the loop 152. By indexing the rotation of the knob 161, it is possible to indicate the penetration of the coupling loop 152. By rotating the member 169, the loop is positioned to monitor power traveling in the opposite direction. Thus it is seen that the embodiment shown in Figures 9 and 10 provides means for accurate positioning of the penetration of the coupling loop 152 within the entire range of penetration.

Figure 11:
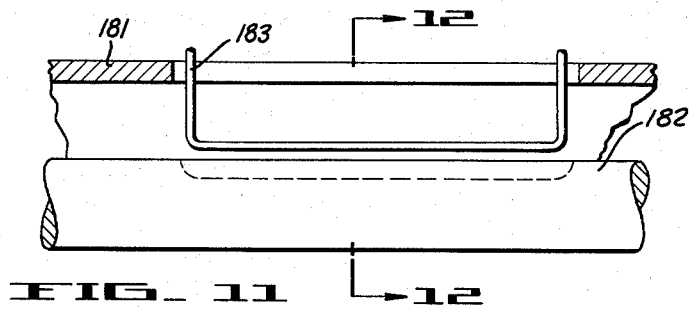
Figure 11 shows a side elevational view of another embodiment of apparatus which incorporates my invention.
Figure 12:
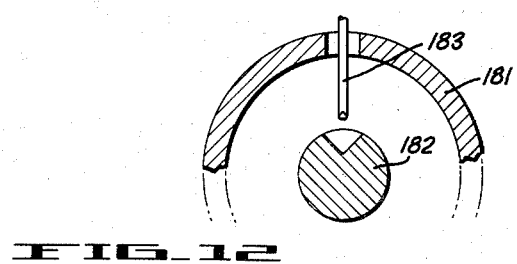
Figure 12 shows a view taken along the lines 12—12 of Figure 11.

We have found that when a coupling loop is adjusted so that it is at its maximum penetration, i.e., adjacent the inner conductor of the coaxial section, the magnetic and electric field lines are distorted. Thus the ratio of capacitive to inductive coupling does not remain constant with penetration. In Figures 11 and 12, I have shown means for maintaining substantially constant directivity in those applications where this is essential. I have shown an outer conductor 181 and an inner conductor 182, together with coupling loop 183. Any of the means previously described for adjusting the penetration of the loop may be used in conjunction with this transmission line section and coupling loop and therefore will not be discussed. I have found that if the central conductor is provided with an elongated recess 184 having its longitudinal axis parallel to the axis of the transmission line and opposite the coupling loop, the directivity of the coupling loop is maintained when the coupling loop is adjacent the inner conductor 182. The recess 184 distorts the lines of electric and magnetic fields in such a manner that the directivity remains constant and high throughout the range of penetration of the loop 183. Although we have found that a slot in the form of a V gives the desired results, other configurations may be employed which give the desired electromagnetic field configuration.

Apparatus was constructed as shown in Figures 4 through 8. The outer conductor had an inner diameter of .9375 inch and the inner conductor had an outer diameter of .407 inch. The loop was ⅜ inch long. The slot through which the coupling loop was passed was ⅛ inch wide and 1⅛ inches long. The terminating resistor which connected the loop to the plug had a value of 68 ohms. The disc capacitor which coupled the loop to the plug had a capacity of 50 μμf. The series resistor had a value of 1500 ohms and the associated capacitor had a value of 1000 μμf. The crystal was one of the type known by manufacturer's specifications as In21B.

Figure 13:
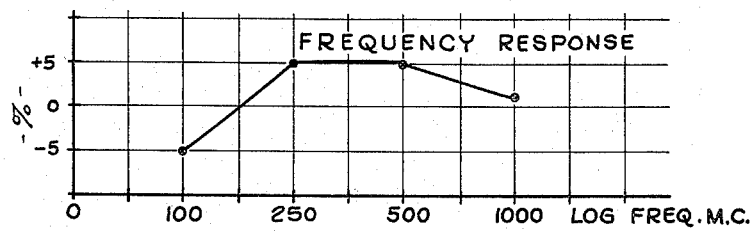
Figure 13 is a frequency response curve for apparatus constructed in accordance with my invention.
Figure 14:
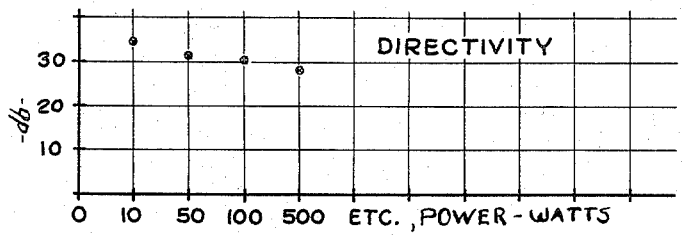
Figure 14 is a curve of directivity for apparatus constructed in accordance with my invention.

Apparatus was constructed in accordance with the above. The voltage standing wave ratio (VSWR) was less than 1.07 over the entire range of frequencies from 100 to 1,000 mc. over a power range of from 10 to 500 watts. In Figure 13, I have shown a frequency response curve for the above apparatus. The percent deviation is deviation from average indicating meter reading. In Figure 14, I have shown a curve of directivity for the above described loop. The directivity is given as a function of power range. It is seen from the above VSWR, frequency response and directivity that I have provided a power monitor which is capable of operation over a broad band of frequencies and a wide range of power and which does not introduce a large voltage standing wave ratio.

I claim:

1. A directional power monitor comprising a section of coaxial transmission line having an inner and a closed outer conductor, an opening formed in a symmetrical, non-planar region of said outer conductor, a conductive closure adapted to be rotatably mounted in said opening, said closure having a concave end surface which corresponds to the projection of the inside surface contour of the outer conductor across said opening, an elongated slot formed in said closure, a coupling loop accommodated in said slot and extending into the line for inductively and capacitively coupling said indicating means to said line to thereby obtain indications of the power flowing in the line in a predetermined direction, means associated with the closure and loop for rotating the same through 180° to monitor power flowing in a predetermined direction, and means associated with the loop for adjustably controlling the penetration of the loop into the line to thereby control the sensitivity of the power monitor to permit monitoring over a wide range of power.

2. A directional power monitor comprising a section of coaxial transmission line having an inner and a closed outer conductor, an opening formed in a symmetrical non-planar region of said outer conductor, a conductive closure adapted to be rotatably mounted in said opening, said closure having a concave end surface which corresponds to the projection of the inside surface contour of the outer conductor across said opening, an elongated slot formed in said closure, a coupling loop accommodated in said slot and extending into the line whereby it is inductively and capacitively coupled to said line to thereby provide an electrical signal indicative of the power flowing in the line in a predetermined direction, means associated with said closure and said loop for indexing the rotative position of the same to two positions substantially 180° apart thereby to permit monitoring of the power flowing in either direction in said line, and means associated with the loop for adjustably controlling the penetration of the loop into the line to thereby control the sensitivity of the power monitor to permit monitoring over a wide range of input power levels.

3. A directional power monitor comprising a section of coaxial transmission line having an inner conductor and an outer conductor, said outer conductor having a closed, ellipse-like cross section, an opening formed in said outer conductor, a conductive closure having a concave end surface corresponding to the projection of the inside surface contour of the outer conductor across said opening, said closure means being rotatably mounted in said opening, an elongated slot formed in said concave surface of said closure, loop means for inductively and capacitively coupling said indicating means to said line to thereby obtain an indication of the power flowing in said line in a predetermined direction, said loop being adapted to be inserted through said slot, mounting means serving to mount said loop, said mounting means being provided with a plurality of cam engaging surfaces disposed at different distances from said inner conductor of said line, cam means adapted to engage different ones of said cam engaging surfaces for different positions of said cam means, means yieldably urging said cam engaging surfaces into contact with said cam means, whereby the penetration of said loop into said line is controlled by the positioning of said cam means, and means serving to mount the closure whereby the same may be rotated through 180° to align the loop with the inner conductor in either of two directions.

4. A directional power monitor comprising a section of coaxial transmission line having an inner conductor and an outer conductor, said outer conductor having a cylindrical inner surface of symmetrical, closed, ellipse-like cross section, an opening formed in said outer conductor, a conductive closure means journaled in said opening for rotation about an axis perpendicular to the longitudinal axis of said coaxial line, said conductive closure means having a concave end surface corresponding to the contour of and completing the inner surface of the outer conductor for two 180° displaced rotative positions of said closure means, said closure means being formed with a narrow elongated slot in said concave end surface, said slot extending through said concave surface parallel to said inner conductor for said two rotative positions of said closure means, means for selectively indexing said closure means to said two rotative positions, a loop supporting means movably carried by said closure means, means restricting movement of said loop supporting means to a direction parallel to the rotative axis of said closure means, means for selectively positioning said loop supporting means to different distances from said inner conductor, an elongated coupling loop carried by said loop supporting means and extending into said coaxial line through said slot different distances for different selected positions of said loop supporting means, the sensitivity of said power monitor thereby being controlled by the position of said loop supporting means.

5. A directional power monitor as in claim 4 wherein said means for selectively positioning said loop supporting means includes means for continuously and micrometrically positioning said loop supporting means.

6. A directional power monitor as in claim 4 wherein said means for selectively positioning said loop supporting means includes means for positioning said loop supporting means in preselected steps.

7. A directional power monitor as in claim 4 wherein said inner conductor is formed with a longitudinal groove in the surface thereof facing said loop whereby the directivity of said power monitor remains substantially constant for all positions of said loop.

8. A directional power monitor comprising a section of coaxial transmission line having an inner and outer conductor, indicating means, an elongated slot formed in said outer conductor, loop means accommodated in said slot and extending into said line for inductively and capacitively coupling said indicating means to said line to thereby obtain an indication of the power flowing in said line in a predetermined derection, and means for adjustably controlling the penetration of said loop into said line to thereby control the coupling to obtain power measurements over a wide range of power, said inner conductor being formed with an elongated groove extending longitudinally of said inner conductor and lying opposite said loop whereby high directivity is maintained over the complete power range.

9. A directional power monitor comprising a section of coaxial transmission line having an inner and outer conductor, an elongated slot formed in said outer conductor, loop means accommodated in said slot and extending into said line for inductively and capacitively coupling energy from said line thereby to provide an electrical signal indicative of the power flowing in the line in a predetermined direction, means for adjustably controlling the penetration of said loop into said line to thereby control the coupling of said loop to said line, said inner conductor being formed with an elongated groove extending longitudinally of said inner conductor and lying opposite said loop whereby high directivity is maintained over the complete range of penetration of said loop.

10. A directional power monitor comprising a section of coaxial transmission line having an inner conductor and an outer conductor, an opening formed in said outer conductor, a conductive closure means journaled in said opening for rotation about an axis perpendicular to the longitudinal axis of said coaxial line, said conductive closure means having a surface corresponding to the contour of and completing the inner surface of the outer conductor for two 180° displaced rotative positions of said closure means, said closure means being formed with an elongated slot therein, said slot extending through said surface parallel to said inner conductor for said two rotative positions of said closure means, means for selectively indexing said closure means to said two rotative positions, a loop supporting means movably carried by said closure means, means restricting movement of said loop supporting means to a direction parallel to the rotative axis of said closure means, means for selectively positioning said loop supporting means to different distances from said inner conductor, an elongated coupling loop carried by said loop supporting means and extending into said coaxial line through a slot different distances for different selected positions of said loop supporting means, the sensitivity of said power monitor thereby being controlled by the position of said loop supporting means, said inner conductor being formed with a longitudinal groove in the surface thereof facing said loop whereby the directivity of said power monitor remains substantially constant for all positions of said loop.

11. A directional power monitor comprising a section of coaxial transmission line having an inner conductor and an outer conductor of circular cross section, an opening formed in said outer conductor, a conductive closure means journaled in said opening for rotation about an axis perpendicular to the longitudinal axis of said coaxial line, said conductive closure means having a concave cylindrical end surface which conforms, for two 180° displaced rotative positions of said closure means, to the projection of the cylindrical inner surface of the outer conductor across said opening in said outer conductor, said inner surface of said outer conductor and said concave end surface of said closure means together forming a continuous, smooth cylindrical surface for said two 180° displaced rotative positions of said closure means, said closure means being formed with a narrow, elongated slot in said concave surface, said slot extending through said concave surface parallel to said inner conductor for said two rotative positions of said closure means, means for selectively indexing said closure means to said two rotative positions, a loop supporting means movably carried by said closure means, means restricting movement of said loop supporting means to a direction parallel to the rotative axis of said closure means, means for selectively positioning said loop supporting means to different distances from said inner conductor, and an elongated coupling loop carried by said loop supporting means and extending into said coaxial line through said slot different distances for different selected positions of said loop supporting means, the sensitivity of said power monitor thereby being controlled by the position of said loop supporting means.

12. A directional power monitor as in claim 11 wherein said means for selectively positioning said loop supporting means includes means for continuously and micrometrically positioning said loop supporting means.

13. A directional power monitor as in claim 11 wherein said means for selectively positioning said loop supporting means includes means for positioning said loop supporting means in preselected steps.

14. A directional power monitor as in claim 11 wherein said inner conductor is formed with a longitudinal groove in said surface thereof facing said loop whereby the directivity of said power monitor remains substantially constant for all positions of said loop.

References Cited in the file of this patent

UNITED STATES PATENTS

| | | |
|---|---|---|
| 1,759,842 | Fossa | May 27, 1930 |
| 2,086,615 | Grundmann | July 13, 1937 |

(Other references on following page)

UNITED STATES PATENTS

| | | |
|---|---|---|
| 2,401,205 | Usselman | May 28, 1946 |
| 2,404,797 | Hansen | July 30, 1946 |
| 2,423,416 | Sontheimer et al. | July 1, 1947 |
| 2,438,912 | Hansen et al. | Apr. 6, 1948 |
| 2,484,331 | Bells | Oct. 11, 1949 |
| 2,515,228 | Hupcey | July 18, 1950 |
| 2,523,254 | Talpey | Sept. 19, 1950 |
| 2,534,437 | Ginzton | Dec. 19, 1950 |
| 2,764,739 | Fiet | Sept. 25, 1956 |
| 2,790,958 | Fiet et al. | Apr. 30, 1957 |

FOREIGN PATENTS

| | | |
|---|---|---|
| 812,012 | France | Apr. 28, 1937 |
| 51,674 | France | Dec. 28, 1942 |
| | (Addition to No. 869,696) | |
| 625,378 | Great Britain | June 27, 1949 |